United States Patent [19]

Gary

[11] Patent Number: 5,662,873
[45] Date of Patent: Sep. 2, 1997

[54] PROCESS FOR THE ELIMINATION OF IMPURITIES CONTAINED IN A GASEOUS COMPOUND

[75] Inventor: Daniel Gary, Montigny le Bretonneux, France

[73] Assignee: L'Air Liquide, Societe Anonyme pour l'Etude et l'Exploitation des Procedes Georges Claude, Paris Cedex, France

[21] Appl. No.: 651,494

[22] Filed: May 22, 1996

[51] Int. Cl.⁶ ............................ C01B 21/04; C01B 3/58; C01B 31/18
[52] U.S. Cl. ................ 423/247; 423/248; 423/437 M; 423/580.1; 423/351
[58] Field of Search ................................ 423/247, 248, 423/437 M, 580.1, 351

[56] References Cited

U.S. PATENT DOCUMENTS

| | | | |
|---|---|---|---|
| 4,019,880 | 4/1977 | Rabo et al. | 55/68 |
| 4,136,062 | 1/1979 | Boudart et al. | 252/460 |
| 5,238,670 | 8/1993 | Louise et al. | 423/351 |
| 5,366,712 | 11/1994 | Violante et al. | 423/248 |

FOREIGN PATENT DOCUMENTS

| | | | |
|---|---|---|---|
| 0 222 497 A2 | 5/1987 | European Pat. Off. . | |
| 0 395 856 A1 | 11/1990 | European Pat. Off. . | |
| 0 454 531 A1 | 10/1991 | European Pat. Off. . | |
| 2 690 357 | 10/1993 | France . | |
| 34 01 197 A1 | 7/1985 | Germany . | |
| 4349935 | 12/1992 | Japan | 423/248 |
| 5329367 | 12/1993 | Japan | 423/248 |
| 6304476 | 11/1994 | Japan | 423/248 |

*Primary Examiner*—Gary P. Straub
*Assistant Examiner*—Timothy C. Vanoy
*Attorney, Agent, or Firm*—Young & Thompson

[57] ABSTRACT

A process for the substantial elimination of at least one of the impurities carbon monoxide and hydrogen contained in a gaseous compound, according to which:

(a) at least one of the impurities carbon monoxide and hydrogen contained in the gaseous compound is caused to react with oxygen, in contact with a catalyst comprising particles, on the one hand, (i) of gold, silver or gold and silver, and, on the other hand, (ii) of at least one metal of the platinum family, these particles being supported by a support to form, respectively, carbon dioxide and water;

(b) as needed, the carbon dioxide and water are eliminated from the gaseous compound;

(c) the gaseous compound is recovered substantially free from its impurities of carbon monoxide and/or hydrogen.

15 Claims, 1 Drawing Sheet

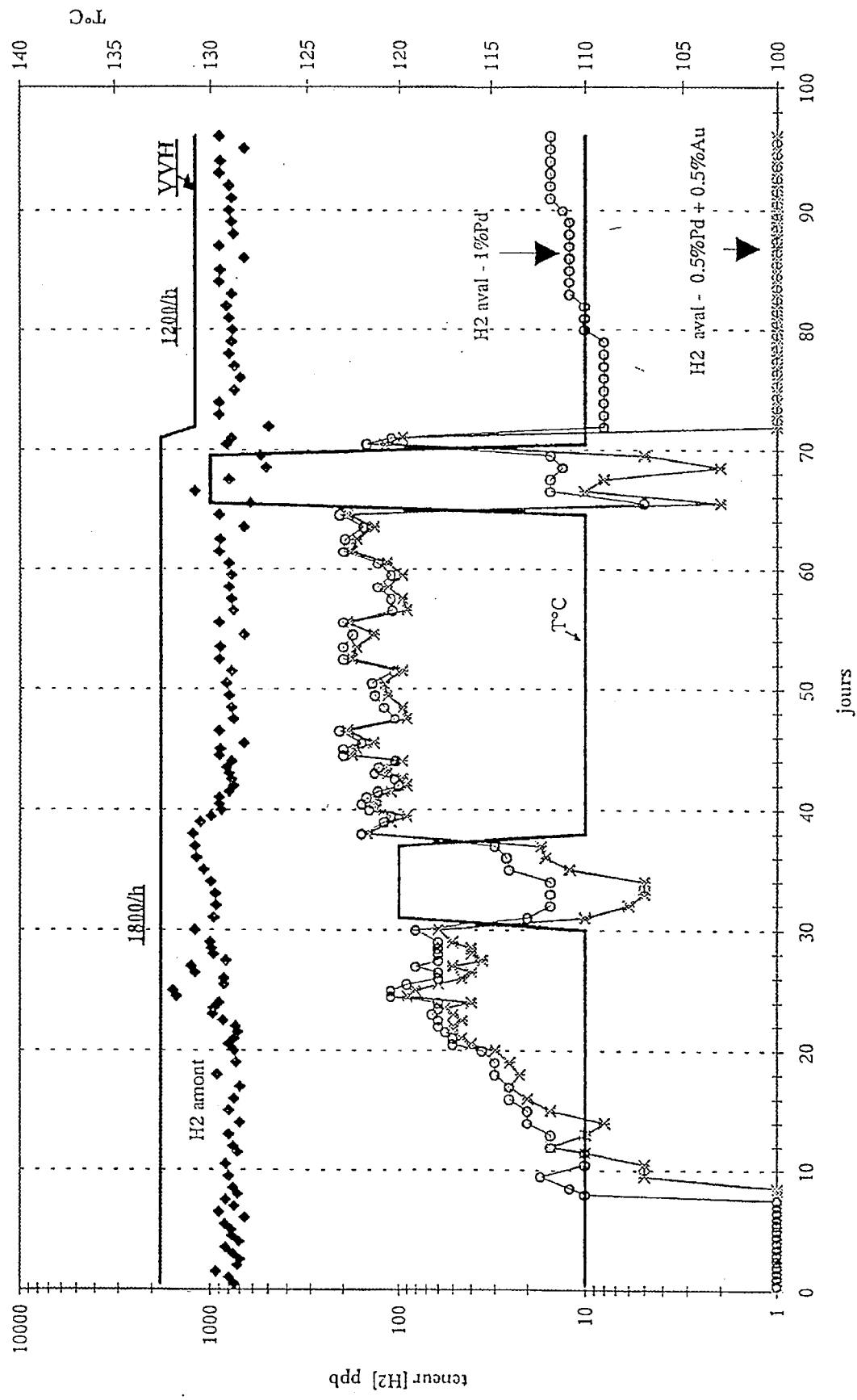

PROCESS FOR THE ELIMINATION OF IMPURITIES CONTAINED IN A GASEOUS COMPOUND

FIELD OF THE INVENTION

The invention relates to a process for the substantial elimination of at least one of the impurities carbon monoxide and hydrogen contained in a gaseous compound, particularly a mixture of nitrogen and/or argon with oxygen, such as air, according to which one of these impurities is caused to react with oxygen in contact with a catalyst.

BACKGROUND OF THE INVENTION

Large quantities of inert gas, particularly argon and above all nitrogen, are used for example in the pharmaceutical and electronic industries, particularly during fabrication of semiconductors. Above all in this latter case, these inert gases must be as pure as possible, and, particularly, they must be substantially free from impurities such as carbon monoxide and hydrogen, which reduce the quality and performances of the semiconductors. Until recently, contents of carbon monoxide and/or hydrogen of the order of several hundreds of ppb (parts per billion by volume) were still tolerated.

But at present, the electronic industry requires inert gases, such as nitrogen, of high purity, which is to say containing less than about 10 ppb of hydrogen and less than 5 ppb of carbon monoxide.

So as to prepare high purity nitrogen, there has already been proposed by the applicant, in European patent application EP-A-0 454 531, a process according to which there is eliminated from air, the impurities carbon monoxide and/or hydrogen, by passage of this air over a catalyst constituted of particles of at least one metallic element selected from the group consisting of copper and metals of the platinum family, namely ruthenium, rhodium, palladium, osmium, iridium and platinum, these particles being supported on a support having a large specific surface. The supports can consist of zeolites, silica or alumina. Air treated by passage over the catalyst is, most often, air compressed by means of a compressor; at the output of this compressor, the air has a temperature usually comprised between 80° C. and 120° C. The air thus purified is stripped of the water and carbon dioxide that it contains, for example by adsorption on a molecular sieve. After which, the air is sent to a distillation column for the separation of nitrogen from the other constituents of the air, essentially oxygen. The applicant has found that good results have been obtained by means of this process, in particular when the catalysts comprise large quantities of particles such as palladium and platinum. However, these precious metals are of high cost, which increases too much the overall cost of preparation of high purity nitrogen.

Moreover, it has been found by the applicant that the catalysts described in the patent EP-A-0 454 531 must, for effective elimination of carbon monoxide and hydrogen, either be frequently regenerated, for example twice a day, or be placed in contact with compressed air whose temperature is brought to about 200° C.

The frequent regeneration of the catalyst involves using two catalyst beds in parallel and operating alternately, one permitting purification of the air while the other is regenerated. As indicated above, compressed air leaves the compressor at a temperature usually comprised between 80° C. and 120° C. Means are needed therefore to heat the air entering into contact with the catalyst to a temperature of 200° C. It has been found that the use of catalysts according to the patent application EP-A-0 454 531 requires a cumbersome installation, notably because of the heating means, and which is of high energy cost.

The applicant has accordingly sought a process to eliminate substantially at least one of the impurities carbon monoxide and hydrogen without the drawbacks recited above.

OBJECTS OF THE INVENTION

Thus, a first object of the invention consists in a process for eliminating one of the impurities from a compressed gas, which can be used with a catalyst having a low precious metal content.

A second object of the invention consists in such a process which can be practiced over a long period of time, for example several weeks, specifically several months or even several years, without it being necessary to regenerate the catalyst, or to bring the gaseous compound to be treated to a temperature of the order of 200° C.

SUMMARY OF THE INVENTION

The present invention relates to a process for the substantial elimination of at least one of the impurities carbon monoxide and hydrogen contained in a gaseous compound, characterized in that:

(a) at least one of the impurities carbon monoxide and hydrogen contained in the gaseous compound is reacted with oxygen, in contact with a catalyst comprising supported particles (i) of gold, of silver or of gold and silver (hereinafter also called particles of gold and/or silver) and (ii) of at least one platinum family metal, the particles being supported by a support, preferably $TiO_2$, to form respectively, carbon dioxide and water;

(b) as the case may be, carbon dioxide and water are eliminated from the gaseous compound;

(c) the gaseous compound is recovered substantially free from its carbon monoxide and/or hydrogen impurities.

BRIEF DESCRIPTION OF THE DRAWINGS

The invention is described in greater detail hereinafter, and with respect to FIG. 1 which shows the elimination of hydrogen from the air according to, on the one hand, the process of the invention and, on the other hand, a process not according to the invention.

DETAILED DESCRIPTION OF THE INVENTION

According to a preferred embodiment of the invention, the catalyst is constituted by supported particles of gold and palladium.

According to another preferred embodiment of the invention, the catalyst is constituted by supported particles of silver and palladium.

The particles are generally supported by a mineral support. This mineral support is preferably titanium dioxide ($TiO_2$), but could also be selected from the group consisting of alumina, zeolites or a silica. The alumina can be a gamma alumina or an alpha alumina. The zeolite can be selected from the group consisting of zeolites X, such as zeolites 13X and 10X, zeolites A, such as zeolites 5A or 4A, zeolites Y, chabazites, mordenites or silicalites. Such zeolites are for example described in U.S. Pat. Nos. 2,882,244; 3,140,932 and 3,140,933.

The weight proportion between the gold and/or silver particles and the particles of platinum family metal can be comprised between 10/90 and 90/10; preferably, this ratio is of the order of 50/50. The weight content of the particles of gold and/or silver can be comprised between 0.1 and 5%, preferably comprised between 0.1 and 1.5% relative to the total weight of the catalyst. The weight content of the platinum family metal is usually comprised between 0.3 and 2.5%, preferably between 0.3 and 1%, relative to the total weight of the catalyst.

It can be advantageous to clad the catalyst such as defined above with cerium oxide ($CeO_2$), particularly to improve the mechanical properties. The weight of this cerium oxide ($CeO_2$) cladding can be comprised between 5 and 15% relative to the weight of the catalyst.

The support can be present in different forms, for example in the form of chips or honeycomb (monolithic structure) but preferably, it is in the form of small balls or rods, which can be easily arranged in a reactor.

The support used is usually porous and can have a pore volume less than or equal to 1 $cm^3/g$, preferably comprised between 0.2 and 0.5 $cm^3/g$.

The radius of the pores of this support can be less than or equal to 25 nm, and preferably is comprised between 1 and 15 nm. The specific surface of the support can be comprised between 10 and 300 $m^2/g$, preferably between 50 and 250 $m^2/g$, more preferably between 50 and 150 $m^2/g$. The mass per volume of the support can be comprised between 500 and 1000 g/l. When the support is $TiO_2$, its mass per volume is preferably comprised between 600 and 900 g/l.

A catalyst used in the process of the invention can be prepared according to known processes of co-precipitation or impregnation. Catalysts prepared according to an impregnation process are preferred. To do this, a catalyst is prepared by impregnating the selected support with a solution comprising a gold and/or silver salt and the salt of at least one platinum family metal. The gold and/or silver salt or the platinum family salt can be a halide, particularly a chloride or preferably a nitrate. After impregnation, the impregnated support is dried, for example by subjecting it for 12 to 48 hours to a temperature comprised between 50° C. and 150° C. The support is then calcined, preferably at a temperature comprised between 300° C. and 550° C. This calcination of the dried impregnated support can be carried out in air, preferably dry air. After calcination, the metal particles are hot reduced, for example by sweeping with a reducing gas such as hydrogen or a mixture of hydrogen and an inert gas such as nitrogen.

The process according to the invention can be particularly practiced on a gaseous compound consisting of a mixture of at least one inert gas with oxygen. The inert gas can be nitrogen or argon; preferably, the gaseous compound is air.

The reaction of the impurities carbon monoxide and hydrogen in contact with the catalyst can be effected with the oxygen contained in the gaseous compound, particularly when this latter consists of air, or with the oxygen added to the gaseous compound. The quantity of oxygen thus added must at least correspond to the stoichiometric quantity required to form carbon dioxide and water, from the impurities.

The reaction between the impurities and the oxygen in contact with the catalyst is usually carried out with a gaseous compound whose temperature is lower than 130° C., more particularly at a temperature comprised between −40° C. and 130° C., and preferably a temperature comprised between 80° and 120° C.

During the reaction of the impurities with oxygen in contact with the catalyst according to the process of the present invention, the gaseous compound can be subjected to a pressure comprised between $10^5$ and $3\times10^6$ Pa, more generally between $7\times10^5$ and $1.5\times10^6$ Pa.

The gaseous compound in contact with the catalyst has a real spatial velocity which is a function of the pressure and temperature of the gaseous compound treated. Generally, the real spatial velocity is below 2000 $h^{-1}$, and preferably comprised between 1000 and 1800 $h^{-1}$.

The contents of carbon monoxide and hydrogen of the treated gaseous compound according to the process of the invention are usually less than 40 ppm (parts per million by volume), more generally of the order of 1 ppm to 200 ppb, as to each of its impurities. The recovered gaseous compound after practice of the process according to the invention should comprise less than 10 ppb of hydrogen and less than 5 ppb of carbon monoxide. These contents are those usually satisfying the needs of the electronic industry.

After reaction between the impurities and oxygen, the carbon dioxide and water formed should be eliminated from the gaseous compound. This elimination can be carried out in a conventional manner by means of an adsorbent such as a molecular sieve or alumina. This elimination of the water and of the carbon dioxide is more particularly required when the gaseous compound is air adapted ultimately to be treated by cryogenic distillation for the separation of nitrogen from the other constituents of air, essentially oxygen, and as the case may be, argon.

The recovered gaseous compound, free or substantially free from its carbon monoxide and hydrogen impurities, can, when it consists of a gaseous mixture, be finally treated so as to separate certain or each of its gases which it contains. Thus, if the gaseous compound consists of air, the air recovered subsequently to the process according to the invention can be treated such that nitrogen and/or argon are separated from the oxygen of the air. This separation can be carried out in a conventional manner by cryogenic distillation, by selective adsorption (PSA and VSA processes) or by membrane separation.

According to another aspect of the invention, the latter concerns a process for the preparation of purified nitrogen substantially free from carbon monoxide and hydrogen impurities, from air, characterized in that:

(a) at least one of the impurities carbon monoxide and hydrogen contained in the air is reacted with oxygen from this air, in contact with a catalyst constituted by particles (i) of gold, of silver, or of gold and silver and (ii) of palladium, the particles being supported by titanium dioxide, so as to form respectively carbon dioxide and water;

(b) as the case may be, carbon dioxide and water are eliminated from the air;

(c) nitrogen is separated from the oxygen of the air;

(d) high purity nitrogen is recovered substantially free from carbon monoxide and hydrogen impurities.

The separation of nitrogen and oxygen from the air is preferably a conventional process of cryogenic distillation.

The examples which follow serve to illustrate the present invention:

EXAMPLE 1

In a reactor, various catalysts are arranged, according or not to the invention, and constituted by metallic particles supported by small balls of alumina. There is treated in this reactor an air flow at 7 bars for elimination of its carbon monoxide and hydrogen impurities. The real spatial velocity of the air through the reactor was 1800 $h^{-1}$.

The upstream contents (at the inlet of the reactor) and downstream contents (at the outlet of the reactor) of carbon monoxide and hydrogen contained in the treated air have been measured by means of an RGA3 analyzer sold by Trace Analytical, whose detection threshold was less than or equal to 5 ppb for hydrogen and less than 3 ppb for carbon monoxide.

The process according to the invention can be practiced by means of a catalyst disposed in a single bed, which it is not necessary to regenerate. Thus, the catalyst according to the invention permits elimination of the impurities carbon monoxide and hydrogen from a gaseous compound, so as to meet the needs of the electronic industry, over a period of several months, namely several years, and at a temperature which can be comprised between 80° C. and 120° C. After this lapse of time, it suffices to replace the used catalyst bed by a new bed.

The duration (in hours) of operation of the catalyst, as well as the upstream and downstream contents of the hydrogen and carbon monoxide of the treated air, are shown in Table I below.

The duration of operation corresponds to the period of time during which the downstream contents of hydrogen and carbon monoxide correspond to the needs of the electronic industry, namely a content less than 10 ppb of hydrogen and a content less than 5 ppb of carbon monoxide. The test is discontinued as soon as the downstream contents exceed those fixed by the requirements. However, the test can be voluntarily discontinued when the downstream contents remain within the requirements, to the extent that the experimenter has considered that the duration of the test is sufficiently probative as to the effectiveness of the catalyst.

TABLE I

| Test | Temperature (°C.) | Catalyst content (% by weight) Au | Pd | Upstream contents (in ppb) $H_2$ | CO | Downstream contents (in ppb) $H_2$ | CO | $H_2O$ in the upstream air (g/Nm$^3$) | Duration (h) |
|---|---|---|---|---|---|---|---|---|---|
| 1 | 110 | 0.5 | 0.5 | 1400 | 350 | ND | 3 | 7 | 150 |
| A | 110 | — | 2 | 1500 | 350 | 15 | 3 | 7 | 2 |
| B | 100 | — | 0.5 | 600 | 300 | 100 | 5 | 1 | 2 |
| C | 120 | 0.5 | — | 600 | 300 | 480 | 5 | 1 | 2 |

ND = not detected

Test 1 is according to the invention.

Tests A, B and C are comparative examples.

It will be seen from a study of Table 1, that a catalyst according to the invention comprising 1% by weight of precious metal (Au+Pd) palladium and gold has a duration of operation very superior to that of a conventional catalyst, comprising 2% by weight of palladium, and this with better efficiency (elimination of impurities).

Tests B and C show moreover that a catalyst comprising only particles of palladium is more effective than a catalyst comprising only gold, and this although the temperature of operation in test C is higher than that of test B.

EXAMPLE 2

In a reactor identical to that of Example 1, there are arranged different catalysts, according or not to the invention, constituted by metallic particles supported by small rods of titanium dioxide. The mass per volume of this support was 915 g/l and its specific surface was 140 m$^2$/g. These catalysts are clad or not with a layer of $CeO_2$.

There was treated in the reactors air at 7 bars, containing 1000 ppb hydrogen and 500 ppb carbon monoxide, and with a real spatial velocity of 1800 h$^{-1}$.

The water content of the upstream air, the carbon monoxide and hydrogen contents of the downstream air, as well as the duration of operation of the catalyst (see Example 1) are shown in Table II as follows:

TABLE II

| Test | Temperature (°C.) | Catalyst content (% by weight) Au | Pd | $CeO_2$ | Downstream contents (in ppb) | $H_2O$ (g/Nm$^3$) | Duration (h) |
|---|---|---|---|---|---|---|---|
| 2 | 100 | 0.5 | 0.5 | O | ND 3 | 7 | 125 |
| 3 | 110 | 0.5 | 0.5 | O | ND 3 | 10 | 50 |
| 4 | 110 | 0.5 | 0.5 | O | ND 3 | 7 | 60 |
| 5 | 120 | 0.5 | 0.5 | O | ND 3 | 10 | 24 |
| 6 | 100 | 0.5 | 0.5 | N | 10 3 | 10 | 20 |
| 7 | 110 | 0.5 | 0.5 | N | ND 3 | 10 | 150 |
| D | 110 | — | 2 | O | 20 3 | 7 | 4 |
| E | 110 | — | 2 | N | 25 3 | 10 | 20 |

ND = not detected
O = clad with $CeO_2$
N = absence of $CeO_2$ cladding

Tests 2 through 7 are according to the invention.

Tests D and E are not according to the invention. Comparative test D has been carried out under the same conditions as test 4, but with a catalyst comprising 2% by weight of palladium, and not 0.5% of palladium and 0.5% by weight of gold. It will be seen that a catalyst according to the invention permits a duration of operation at least 15 times greater than that of a catalyst not according to the invention, and this, on the one hand, with better efficiency of elimination of the impurities and, on the other hand, with twice as low a precious metal content.

Test 7 was conducted under the same conditions as comparative test E, but with twice as little precious metal. The catalyst according to test E permitted purification according to the requirements only for a period less than 20 hours. Test 7 permitted purification according to requirements for 150 hours, after which the test was voluntarily discontinued.

EXAMPLE 3

In a reactor identical to that of Example 1, there are arranged different catalysts, comprising metallic particles supported by alumina or by titanium dioxide identical to that of Example 2.

There was treated for two hours by means of these catalysts, air containing 500 ppb hydrogen and different concentrations of water. The minimum temperature necessary for total elimination of hydrogen was studied. The results obtained are given in Table III as follows:

TABLE III

| Test | Support | Catalyst content (% by weight) Au | Ag | Pd | $CeO_2$ | Minimum Temperature (°C.) for $H_2O$ 1 g/Nm$^3$ | 6 g/Nm$^3$ | 10 g/Nm$^3$ |
|---|---|---|---|---|---|---|---|---|
| 8 | $TiO_2$ | 0.5 | — | 0.5 | N | 70 | 100 | 110 |
| 9 | $TiO_2$ | 0.5 | — | 0.5 | O | — | 100 | 110 |
| 10 | $TiO_2$ | — | 0.5 | 0.5 | N | — | 105 | 115 |
| F | $TiO_2$ | — | — | 2 | N | 70 | 115 | 120 |

TABLE III-continued

| Test | Support | Catalyst content (% by weight) | | | | Minimum Temperature (°C.) for H₂O | | |
|------|---------|------|------|------|------|------|------|------|
| | | Au | Ag | Pd | CeO₂ | 1 g/Nm³ | 6 g/Nm³ | 10 g/Nm³ |
| G | TiO₂ | — | — | 2 | O | — | 115 | 120 |
| H | Al₂O₃ | — | — | 2 | O | 100 | 110 | 120 |

O = clad with CeO₂
N = not clad with CeO₂

Tests 8 through 10 are according to the invention. They were carried out with catalyst comprising 1% by weight of precious metal (Au+Pd or Ag+Pd). Tests F through H are not according to the invention. They were carried out with 2% by weight palladium.

These tests show that a catalyst according to the invention permits using a lesser quantity of precious metal for a similar result, or even an improved result.

EXAMPLE 4

In a reactor identical to that of Example 1, there is arranged a catalyst according to the invention, consisting of small rods of TiO₂ supporting particles of palladium and gold. The weight content of palladium and gold in the catalyst is 0.5% of each of these metals.

In parallel, in a reactor identical to that of Example 1, is arranged a catalyst not according to the invention, consisting of small rods of TiO₂ supporting particles of palladium (1% by weight relative to the total weight of the catalyst). The mass per volume of TiO₂ was 780 g/l and its specific surface was 95 m²/g.

There is treated in each of these reactors a same air flow (divided into two parallel flows) at 7 bars, comprising about 1000 ppb hydrogen and 10 g/Nm³ of water. Over 72 hours, the real spatial velocity of the air at the inlet of the reactor was 1800 h⁻¹; after this, the spatial velocity was brought to 1200 h⁻¹.

The results obtained are shown in FIG. 1. They show in particular that, as early as the eighth day, the hydrogen content of the air treated with catalyst not according to the invention reached, and then exceeded 10 ppb. With the same quantity of precious metal, a catalyst according to the invention can maintain a content lower than 10 ppb for 11 days.

Moreover, when the RSV is brought to 1200 h⁻¹, the hydrogen content of the treated air cannot be maintained below 10 ppb for longer than 8 days, with a catalyst not according to the invention. But under the same conditions, but with a catalyst according to the invention, hydrogen was not detected for a period of at least 28 days.

EXAMPLE 5

In a reactor No. 1 identical to that of Example 1, there is arranged a catalyst according to the invention, consisting of small rods of TiO₂ supporting particles of palladium. The weight content of palladium supported by the catalyst is 0.5%. The mass per volume was 780 g/l and its specific surface was 95 m²/g.

In parallel, in a reactor No. 2 identical to that of Example 1, there is arranged a catalyst not according to the invention, consisting of small balls of ZrO₂ supporting particles of palladium (0.5% by weight relative to the total weight of the catalyst). The mass per volume of the ZrO₂ was 1200 g/l and its specific surface was 95 m²/g.

There was treated in each of these reactors a same air flow (divided into two parallel flows) at 7 bars, containing about 1000 ppb of H₂ (upstream content) and 1 g/Nm³ of water.

The real spatial velocity of the air at the inlet of the reactor was 1800 h⁻¹ and the operating temperature 120° C.

After 10 hours of trial, the load of catalyst 0.5% Pd supported on ZrO₂ and contained in reaction No. 2 was replaced by a load of catalyst of 0.5% Pd supported by small balls of MgO; its mass per volume was 950 g/l. The test conditions (pressure, flow rate, pollution . . . ) are analogous to those of the test carried out in reactor No. 2 previously, filled with small balls of ZrO₂ supporting 0.5% Pd.

The results obtained with these three catalysts are set forth in Table IV below:

TABLE IV

| Test | Support | Catalyst content | Upstream Content (ppb) | | duration (h) |
|------|---------|------|------|------|------|
| | | | H₂ | CO | |
| 11 | TiO₂ | 0.5% Pd | ND | 3 | 200 |
| I | ZrO₂ | 0.5% Pd | 400 | 3 | 10 |
| J | MgO | 0.5% Pd | 420 | 3 | 10 |

ND = not detected

It will be seen from Table IV that test 11 is according to the invention, whilst tests I and J are not.

Thus, although the three catalysts tested contain an identical mass of Pd particles (0.5% Pd by weight), only the support TiO₂ impregnated with Pd permits obtaining a maximum purification from H₂ (not detectable); the difference of efficiency is thus imputable to the nature of the support (TiO₂).

EXAMPLE 6

In reactor No. 1 identical to that of Example 1, there is arranged a catalyst according to the invention, consisting in small rods of TiO₂ supporting 0.5% Pd+5% Ag (% by weight relative to the mass of the catalyst); the mass per volume of this catalyst was 850 g/l and its specific surface was 150 m²/g.

In parallel, there is arranged in a reactor No. 2 identical to that of Example 1, a catalyst not according to the invention consisting of small balls of Al₂O₃ supporting 0.5% Pd+5% Ag (% by weight); its mass per volume was 670 g/l and its specific surface was 120 m²/g.

There was treated in each of these reactors a same air flow (divided into two parallel flows) at 7 bars containing about 1000 ppb of H₂ (upstream content) and 8 g/Nm³ of water. The real spatial velocity of the air at the inlet of the reactor was 1800 h⁻¹ and the operating temperature was 110° C.

The results obtained from these two catalysts are set forth in Table V as follows:

TABLE V

| Test | Support | Content (weight %) of catalyst Pd | Content (weight %) of catalyst Ag | Upstream Content $H_2$ (ppb) | duration (h) |
| --- | --- | --- | --- | --- | --- |
| 12 | $TiO_2$ | 0.5 | 5 | ND | 400 |
| K | $Al_2O_3$ | 0.5 | 5 | 800 | 200 |

ND = not detected

It is seen from Table V above that test 12 is according to the invention, whilst test K is not.

Again, although the two supports used were impregnated with the same mass of particles of Pd (0.5%) and Ag (5%), it will be seen that only the catalyst of test 12 (according to the invention) permits obtaining maximum efficiency (not detectable) in the purification of the air flow from its $H_2$ impurity.

Moreover, it will be noted that the conventional support $Al_2O_3$ is substantially ineffective; the downstream air flow still containing 80% of its $H_2$ impurity.

The role of the nature of the support ($TiO_2$) is therefore of primary importance in this type of purification.

The preceding tests therefore show the superior efficiency of the catalyst according to the invention.

I claim:

1. Process for the substantial elimination of at least one of the impurities carbon monoxide and hydrogen contained in a gas, the process comprising:
    (a) reacting at least one of the impurities carbon monoxide and hydrogen contained in said gas with oxygen, in contact with a catalyst comprising particles of (i) a first member consisting of silver, and (ii) at least a second member selected from the group consisting of the platinum group metals wherein the particles are supported on a support consisting of titanium dioxide, to form respectively carbon dioxide and water from the catalytic oxidation of the carbon monoxide or hydrogen; wherein the temperature of the gas in contact with the catalyst is between 80° and 130° C., the weight ratio between the particles of the first member and the second member is between 90/10 and 10/90, and the weight content of the particles of the first member is between 0.1% and 5% relative to the total weight of the catalyst;
    (b) eliminating carbon dioxide and water from said reacted gas; and
    (c) recovering a purified gas which contains less than 5 ppb of carbon monoxide and less than 10 ppb of hydrogen impurities.
2. Process according to claim 1, wherein the catalyst comprises supported particles of silver and palladium.
3. Process according to claim 1, wherein the catalyst is clad with cerium oxide ($CeO_2$).
4. Process according to claim 1, wherein the weight ratio is 50/50.
5. Process according to claim 1, wherein the weight content of the particles of the first member is between 0.1 and 1.5% relative to the total weight of the catalyst.
6. Process according to claim 1, wherein the weight content of the particles of the second member is between 0.3 and 2.5% relative to the total weight of the catalyst.
7. Process according to claim 6, wherein the weight content of the particles of the second member is between 0.3 and 1% relative to the total weight of the catalyst.
8. Process according to claim 1, wherein the gas is a mixture of at least one inert gas and oxygen.
9. Process according to claim 1, wherein the gas is air.
10. Process according to claim 1, wherein the gas in contact with the catalyst is subjected to a pressure between $10^5$ and $3 \times 10^6$ Pa.
11. Process according to claim 10, wherein the gas in contact with the catalyst is subjected to a pressure between $7 \times 10^5$ and $1.5 \times 10^6$ Pa.
12. Process according to claim 1, wherein the real spatial velocity is below 2000 $h^{-1}$.
13. Process according to claim 12, wherein the temperature of the gas in contact with the catalyst is between 80° and 120° C., and the real spatial velocity is between 1000 and 1800 $h^{-1}$.
14. Process for the production of nitrogen substantially free from carbon monoxide and hydrogen impurities, from air, which comprises:
    (a) reacting at least one of the impurities carbon monoxide and hydrogen contained in the air with oxygen of the air, in contact with a catalyst comprising particles of (i) silver, and (ii) palladium, the particles being supported on a support consisting of titanium dioxide, so as to form respectively carbon dioxide and water from the catalytic oxidation of the carbon monoxide or hydrogen; wherein the temperature of the gas in contact with the catalyst is between 80° and 130° C., the weight ratio between the particles of the first member and the second member is between 90/10 and 10/90, and the weight content of the particles of the first member is between 0.1% and 5% relative to the total weight of the catalyst;
    (b) eliminating carbon dioxide and water from the air;
    (c) separating nitrogen from the oxygen of the air; and
    (d) recovering a high purity nitrogen which contains less than 5 ppb of carbon monoxide and less than 10 ppb of hydrogen impurities.
15. Process according to claim 14, wherein the nitrogen is separated from the oxygen of the air, by cryogenic distillation.

* * * * *